(12) United States Patent
Pace

(10) Patent No.: US 6,543,180 B2
(45) Date of Patent: Apr. 8, 2003

(54) NON-CHEMICAL FLY REPELLANT DEVICE

(76) Inventor: Rita Cyann Pace, 1712 Christmas Tree La., Ponca City, OK (US) 74604

( * ) Notice: Subject to any disclaimer, the term of this patent is extended or adjusted under 35 U.S.C. 154(b) by 0 days.

(21) Appl. No.: 09/792,529

(22) Filed: Feb. 26, 2001

(65) Prior Publication Data

US 2002/0116864 A1 Aug. 29, 2002

(51) Int. Cl.$^7$ .............................. A01M 1/10; A01M 1/20
(52) U.S. Cl. ............................................ 43/107; 43/122
(58) Field of Search ........................... 43/107, 109, 122

(56) References Cited

U.S. PATENT DOCUMENTS

| | | | | |
|---|---|---|---|---|
| 459,089 | A | * | 9/1891 | Muller ........................ 43/107 |
| 514,946 | A | * | 2/1894 | Long ........................... 43/122 |
| 4,794,724 | A | * | 1/1989 | Peters ......................... 43/122 |
| 4,873,787 | A | * | 10/1989 | Schneidmiller ............. 43/122 |
| 4,899,485 | A | * | 2/1990 | Schneidmiller ............. 43/122 |
| 4,908,980 | A | | 3/1990 | Sherman |
| 4,919,926 | A | | 4/1990 | Watanabe |
| 5,089,384 | A | | 2/1992 | Hale |
| 5,490,349 | A | | 2/1996 | Muramatsu |
| 5,505,017 | A | | 4/1996 | Nelson |
| 5,607,711 | A | | 3/1997 | Langunas-Solar |

FOREIGN PATENT DOCUMENTS

AT 58479 * 4/1913 ................. 43/113

* cited by examiner

Primary Examiner—Kurt Rowan
(74) Attorney, Agent, or Firm—Randal D. Homburg

(57) ABSTRACT

The invention relates to a non-chemical device for repelling flies from a covered area open to the outside, the invention hung from edges of the covered area. The device repels flies from such covered area using the prismatic effect of ambient light passing through the fluid contents of the transparent container without the use of pesticides, sticky films or residue which can contaminate and harm the environment. The device may also use mild chemical repellants to the liquid contents to prevent flying insects from entering the liquid contents deterring the laying eggs upon the liquid.

3 Claims, 4 Drawing Sheets

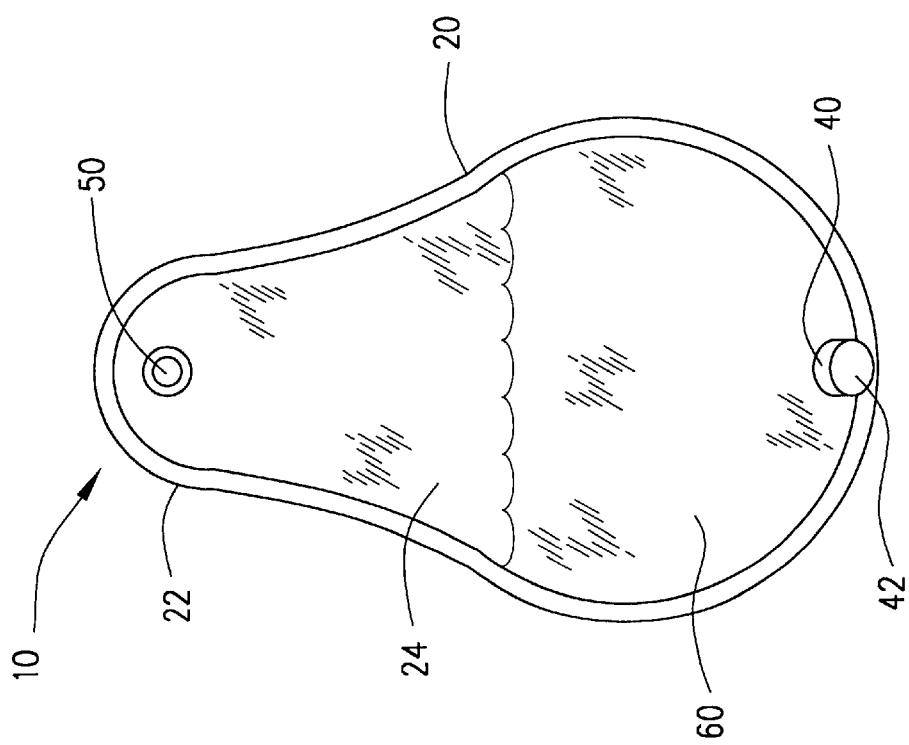
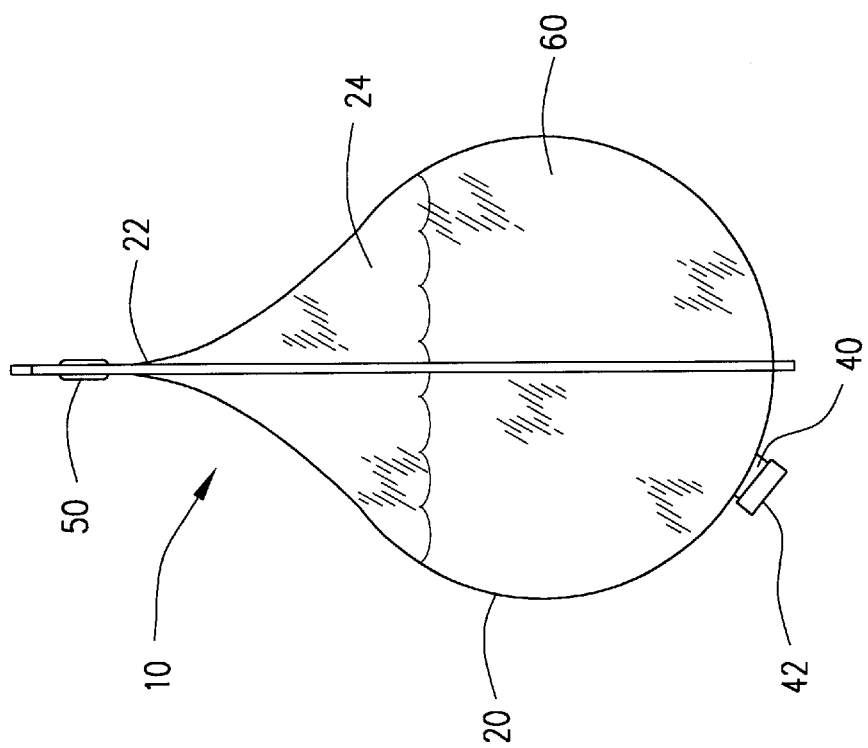

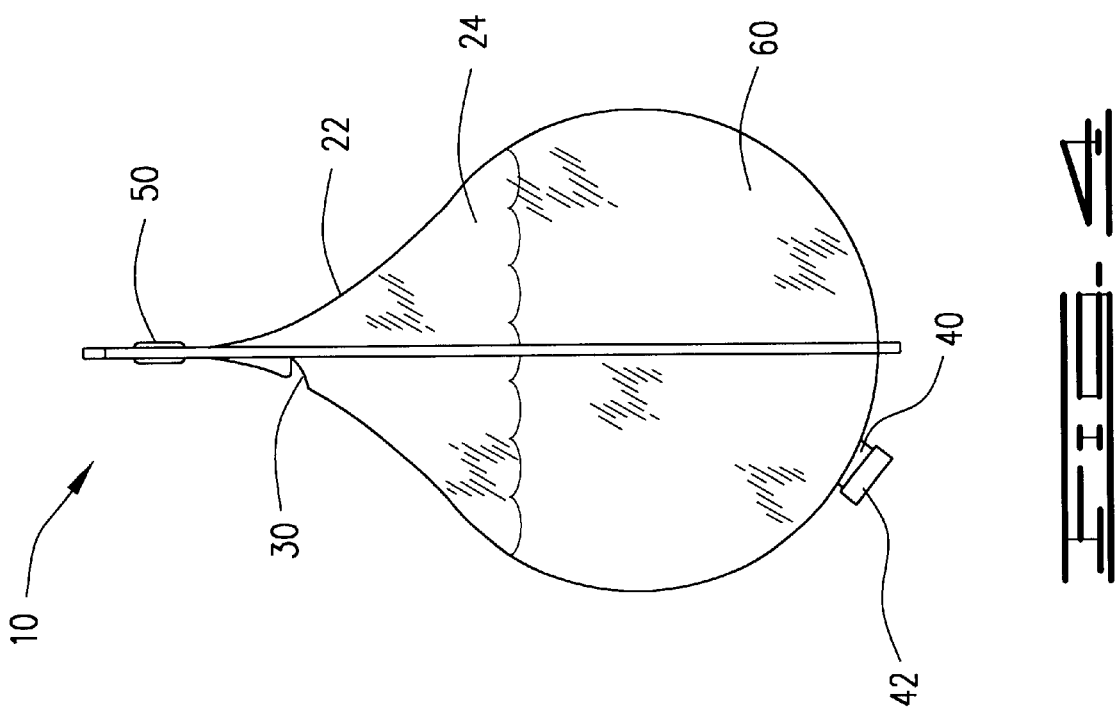
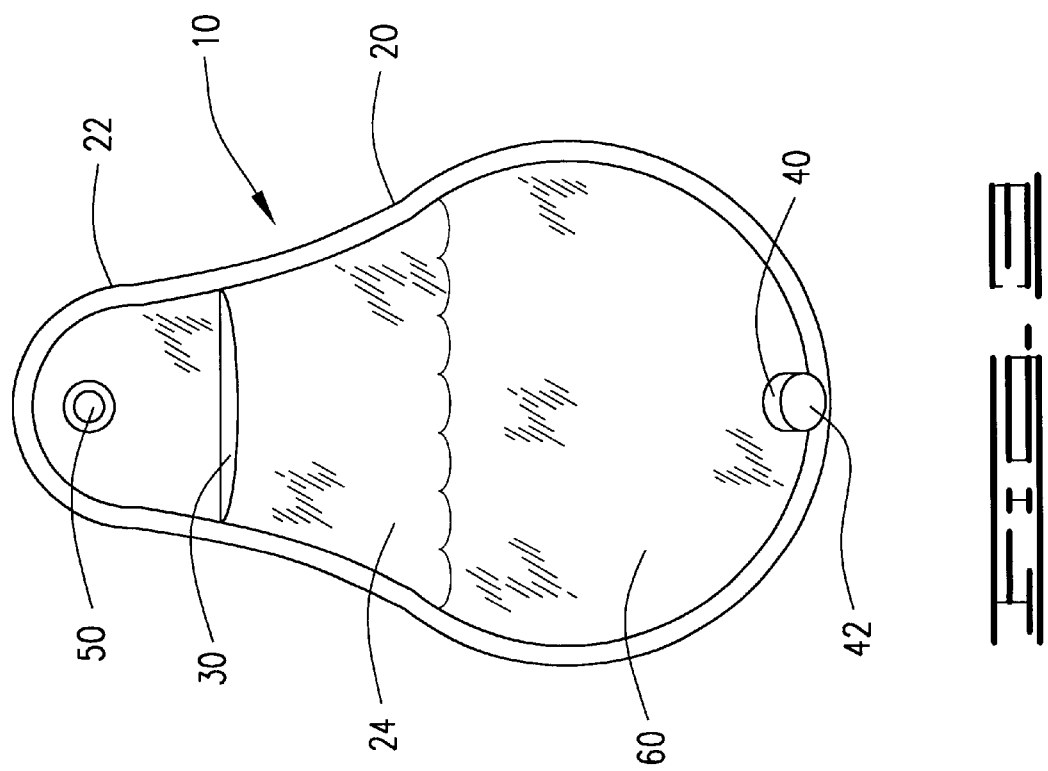

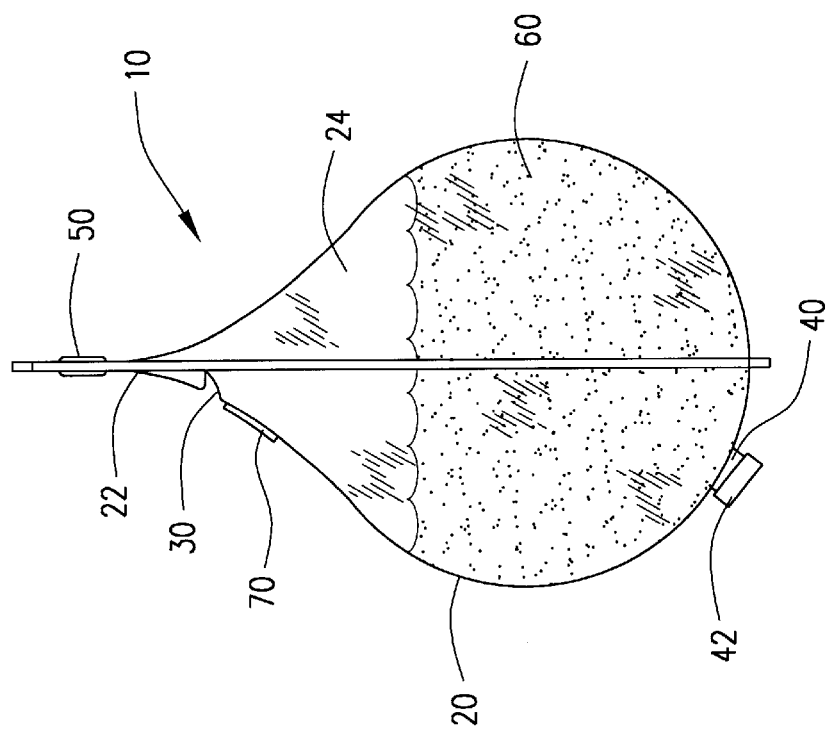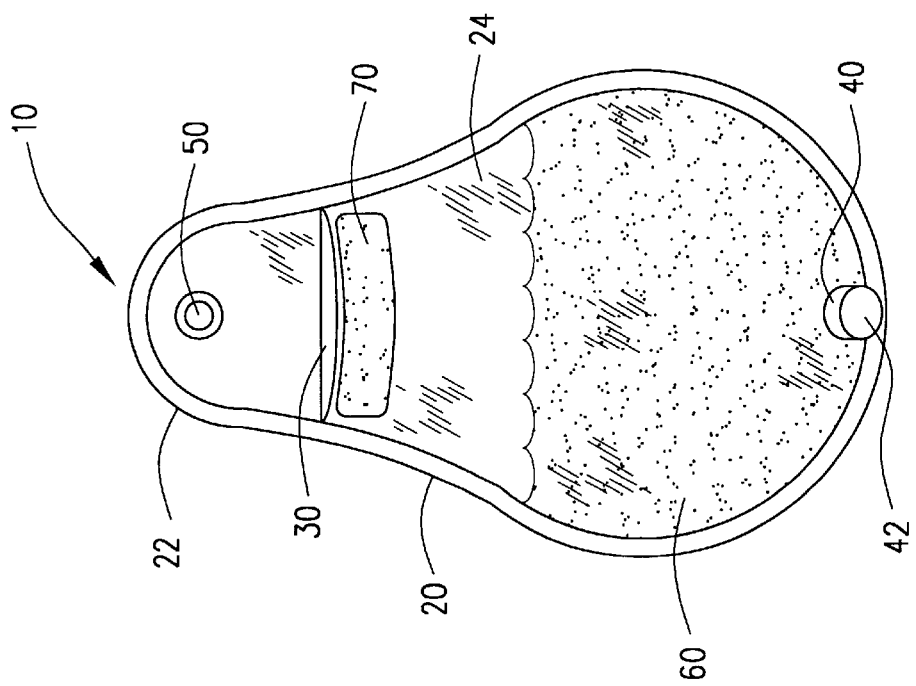

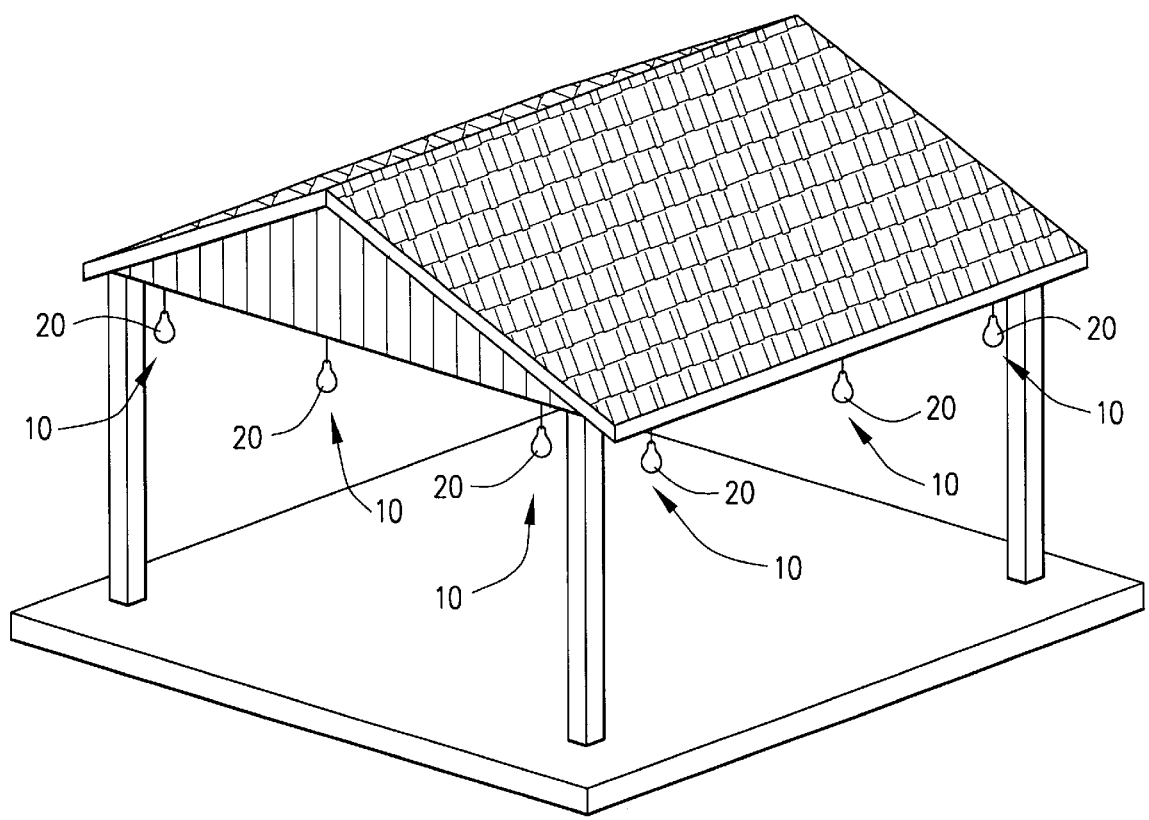

NON-CHEMICAL FLY REPELLANT DEVICE

CROSS REFERENCE TO RELATED APPLICATIONS

None

I. BACKGROUND OF THE INVENTION

1. Field of Invention

The invention relates to a non-chemical device for repelling flies from a covered area open to the outside, the invention hung from edges of the covered area. The device repels flies from such covered area using the prismatic effect of ambient light passing through the fluid contents of the transparent container without the use of pesticides, sticky films or residue which can contaminate and harm the environment. The device may also use mild chemical repellants to the liquid contents to prevent flying insects from entering the liquid contents deterring the laying eggs upon the liquid.

2. Description of Prior Art

Prior to the instant invention, means of repelling flies included chemical agents or physical barriers to prevent the intrusion of flies to an area. Flyswatters, birds, flypaper, toxic chemicals and electronic devices have also been used with mixed success for certain areas, mostly by killing those flies that entered the area. This invention requires no chemicals, no electricity or power supply, no human effort or vigilance and can be used in private of commercial location, especially those location having a large confined animal population, including hog farms, chicken farms and other livestock feed yards at a nominal cost and without environmental impact.

The following United States patents were discovered and are disclosed within this application for utility patent. All relate to insect repelling or exterminating devices using light or chemical means. In U.S. Pat. No. 5,607,711 to Langunas-Solar, a non-chemical, non-residue method of controlling pests, pathogens and organisms found in food products is disclosed using ultra-short pulses of emitted ultraviolet light, heating the insect but not effecting the food product. A trap using light as an attractant is disclosed in U.S. Pat. No. 5,505,017 to Nelson, et al. which lures the insect into the device using the reflected and radiated light, where the insect is trapped on a surface. A liquid attractant in an insect trap is disclosed in U.S. Pat. No. 5,490,349 to Muramatsu, which has a nipple entry attracting the insect into the device after which the insect is unable to find egress from the device, the liquid being of the type to attract insects of the nature of those being trapped. "Evil" destruction caused by insects is thwarted by a light shielding agent which absorbs light normally attractive to insects, the liquid shielding agent applied to normally transparent surface through which light is passed, as disclosed in U.S. Pat. No. 4,919,926 to Watanabe, et al. The use of a translucent shield leaching an insecticide to its surface through the heat of ambient light, while converting such ambient light into a spectrum attracting flying insects is disclosed in U.S. Pat. No. 4,908,980 to Sherman.

II. SUMMARY OF THE INVENTION

The primary objective of the invention is to provide a device which repels flies without chemical means and without contact. The current invention uses the prismatic effect of refracted ambient light through a clear liquid to repel flies or other flying insects having similar visual function as a fly. The invention is a clear container hung from the edge of a covered area filled with clear liquid, having a second objective of maintaining the clear liquid content without stagnation by the addition of a liquid stabilizer and to protect the entry to the fluid contents by the application of a mild chemical repellant (citronella) to deter entry of waterborne egg laying insects (mosquitoes).

III. DESCRIPTION OF THE DRAWINGS

The following drawings are submitted with this utility patent application.

FIG. 1 is a front view of the invention.

FIG. 2 is a side view of the invention.

FIG. 3 is a front view of a second embodiment of the invention.

FIG. 4 is a side view of a second embodiment of the invention.

FIG. 5 is a front view of a third embodiment of the invention.

FIG. 6 is a side view of a third embodiment of the invention.

FIG. 7 shows a plurality of devices.

IV. DESCRIPTION OF THE PREFERRED EMBODIMENTS

The invention is a method and plurality of devices to repel flies in a confined or covered area, each of the devices 10, as shown in FIGS. 1–6 of the drawings, comprising a tear-shaped transparent envelope 20 having a top portion 22 and an interior pocket 24, such interior pocket 24 filled with a clear transparent liquid 60. One preferred chemical stabilizer added to the clear transparent liquid being liquid or dry chlorine, as used in the stabilization of water in swimming pools. The tear-shaped transparent envelope 20 may also have an opening 30 near the top portion 22 for the filling and changing of the clear transparent liquid 60 within the interior pocket 24, as shown in FIGS. 3 and 4 of the drawings. In a preferred embodiment, as shown in FIGS. 5 and 6 of the drawings, the opening 30 is lined with a mild insect repellant strip 70 to deter other insects from entering the interior pocket 24 and laying eggs in the clear transparent liquid 60 contained therein. One preferred embodiment incorporates citronella into the mild insect repellant strip 70, which is known in the art to deter mosquitoes. Each device may also include a drain hole 40 with a drain hole plug 42, as shown in FIGS. 1–6 of the drawings.

The top portion 22 of the tear-shaped transparent envelope 60 includes a reinforced hanging hole 50, as shown in FIGS. 1–6 of the drawings, which is provided to allow the tear-shaped transparent envelope 20 to be hung on the edge of the covered area using string or a hook, allowing the tear-shaped transparent envelope 20 to somewhat swing slightly and freely in the breeze. In preferred usage, the plurality of the devices 10 are hung around the perimeter of a covered area at least every eight feet apart at a height of between three and eight feet from the ground. Variables including wind, temperature and fly attracted under the covered area can effect the number of individual devices requires to effectively control the covered area from fly entry.

The method for repelling flies from a covered area includes providing a plurality of the tear-shaped transparent envelopes 20 as disclosed above, filling the tear-shaped transparent envelopes 20 with the clear transparent liquid 60, stabilizing the clear transparent liquid 60 with the chemical stabilizer 62, and suspending the filled tear-shaped transparent envelopes 20 around the perimeter of the confined or covered area to encircle the confined or covered area at least every eight feet at a height of at least three feet and no more than eight feet. Reduced effectiveness is observed when not enough of the devices 10 are hung in the area to be protected, and use of a single device 10 is generally inadequate to cause any reduction in the fly population in the area, thereby requiring the indicated plurality of devices as indicated above.

Preferred and recommend application of this method and system includes commercial hog farms, commercial livestock feeding areas, backyard home patios, outdoor tents and canopies, pavilions and campsites.

While the invention has been particularly shown and described with reference to a preferred embodiment thereof, it will be understood by those skilled in the art that changes in form and detail may be made therein without departing from the spirit and scope of the invention.

What is claimed is:

1. A plurality of devices to repel flies in a confined or covered area, each of the devices comprising:
   a. a tear-shaped transparent envelope having a top portion, an interior pocket, and an opening providing access to the interior pocket, the opening lined with a mild insect repellant strip;
   b. a clear transparent liquid within the interior pocket; and
   c. a reinforced hanging hole in the top portion, each device being hung apart from other devices in an area to be protected, wherein the mild insect repellant strip prevents other insects from entering the interior pocket and laying eggs in the a clear transparent liquid within the interior pocket.

2. A plurality of devices to repel flies in a confined or covered area, each of the devices comprising:
   a. a tear-shaped transparent envelope having a top portion, an interior pocket, and an opening providing access to the interior pocket;
   b. a clear transparent liquid within the interior pocket;
   c. a mild insect repellant strip at the opening of the tear-shaped transparent envelope to prevent other insects from entering the interior pocket and laying eggs in the clear transparent liquid therein; and
   d. a reinforced hanging hole in the top portion, through which each device is hung apart from other devices in an area to be protected, at least every eight feet at a height of at least three feet and no more than eight feet, encircling the confined or covered area to be protected.

3. The device as disclosed in claim 2, further comprising a drain hole with a drain hole plug into the interior pocket.

* * * * *